United States Patent
Schaefer et al.

(10) Patent No.: US 8,454,434 B1
(45) Date of Patent: Jun. 4, 2013

(54) GAMING SYSTEM AND METHOD FOR PROVIDING AN OFFER AND ACCEPTANCE GAME WITH PROGRESSIVE AWARDS ASSOCIATED WITH A QUANTITY OF PROGRESSIVE TOKENS

(75) Inventors: Craig M. Schaefer, Las Vegas, NV (US); Christopher B. Drake, Reno, NV (US); Daniel J. Uomini, Las Vegas, NV (US); Cameron A. Filipour, Las Vegas, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/524,987

(22) Filed: Jun. 15, 2012

(51) Int. Cl.
*A63F 9/24* (2006.01)
*A63F 13/00* (2006.01)
*G06F 17/00* (2006.01)
*G06F 19/00* (2006.01)

(52) U.S. Cl.
USPC .................... 463/27; 463/20; 463/25; 463/26

(58) Field of Classification Search
USPC ........... 463/16–20, 25–29, 40–42; 273/138.1, 273/139
See application file for complete search history.

(56) References Cited

U.S. PATENT DOCUMENTS

| | | |
|---|---|---|
| 4,695,053 A | 9/1987 | Vazquez, Jr. et al. |
| 5,205,555 A | 4/1993 | Hamano |
| 5,280,909 A | 1/1994 | Tracy |
| 5,324,041 A | 6/1994 | Boylan et al. |
| 5,342,047 A | 8/1994 | Heidel et al. |
| 5,344,144 A | 9/1994 | Canon |
| 5,364,104 A | 11/1994 | Jones et al. |
| 5,536,016 A | 7/1996 | Thompson |
| 5,766,076 A | 6/1998 | Pease et al. |
| 5,769,716 A | 6/1998 | Saffari et al. |
| 5,788,573 A | 8/1998 | Baerlocher et al. |
| 5,833,536 A | 11/1998 | Davids et al. |
| 5,833,537 A | 11/1998 | Barrie |
| 5,851,148 A | 12/1998 | Brune et al. |
| 5,855,515 A | 1/1999 | Pease et al. |
| 5,873,781 A | 2/1999 | Keane |
| 5,885,158 A | 3/1999 | Torango et al. |
| 5,947,820 A | 9/1999 | Morro et al. |
| 5,964,463 A | 10/1999 | Moore, Jr. |
| 5,980,384 A | 11/1999 | Barrie |
| 5,984,781 A | 11/1999 | Sunaga |
| 5,997,400 A | 12/1999 | Seelig et al. |
| 6,004,207 A | 12/1999 | Wilson, Jr. et al. |
| 6,015,346 A | 1/2000 | Bennett |
| 6,033,307 A | 3/2000 | Vancura |
| 6,059,289 A | 5/2000 | Vancura |

(Continued)

FOREIGN PATENT DOCUMENTS

| | | |
|---|---|---|
| EP | 0945837 | 9/1999 |
| WO | PCT/AU97/00121 | 9/1997 |

*Primary Examiner* — Milap Shah
(74) *Attorney, Agent, or Firm* — Neal, Gerber & Eisenberg LLP

(57) ABSTRACT

A gaming system for providing a progressive award in association with an offer and acceptance game. Upon an occurrence of a triggering event, the gaming system initiates a multiple round offer and acceptance game, wherein each round is associated with a progressive award token. After either accepting a final offer or participating in a selection game for a final round of the offer and acceptance game, based on the player's total quantity of accumulated progressive award tokens, one of a plurality of progressive awards is provided to the player.

46 Claims, 17 Drawing Sheets

U.S. PATENT DOCUMENTS

| | | | |
|---|---|---|---|
| 6,089,976 A | 7/2000 | Schneider et al. | |
| 6,102,798 A | 8/2000 | Bennett | |
| 6,110,043 A | 8/2000 | Olsen | |
| 6,120,031 A | 9/2000 | Adams | |
| 6,126,542 A | 10/2000 | Fier | |
| 6,126,547 A | 10/2000 | Ishimoto | |
| 6,135,885 A | 10/2000 | Lermusiaux | |
| 6,155,925 A | 12/2000 | Giobbi et al. | |
| 6,159,095 A | 12/2000 | Frohm et al. | |
| 6,159,097 A | 12/2000 | Gura | |
| 6,159,098 A | 12/2000 | Slomiany et al. | |
| 6,162,121 A | 12/2000 | Baerlocher et al. | |
| 6,164,652 A | 12/2000 | Lauretta et al. | |
| 6,168,520 B1 | 1/2001 | Baerlocher et al. | |
| 6,168,523 B1 | 1/2001 | Piechowiak et al. | |
| 6,173,955 B1 | 1/2001 | Perrie et al. | |
| 6,174,235 B1 | 1/2001 | Walker et al. | |
| 6,190,255 B1 | 2/2001 | Thomas et al. | |
| 6,193,606 B1 | 2/2001 | Walker et al. | |
| 6,203,010 B1 | 3/2001 | Jorasch et al. | |
| 6,203,429 B1 | 3/2001 | Demar et al. | |
| 6,210,275 B1 | 4/2001 | Olsen | |
| 6,213,876 B1 | 4/2001 | Moore, Jr. | |
| 6,231,442 B1 | 5/2001 | Mayeroff | |
| 6,231,445 B1 | 5/2001 | Acres | |
| 6,234,897 B1 | 5/2001 | Frohm et al. | |
| 6,261,177 B1 | 7/2001 | Bennett | |
| 6,270,409 B1 | 8/2001 | Shuster | |
| 6,299,165 B1 | 10/2001 | Nagano | |
| 6,309,300 B1 | 10/2001 | Glavich | |
| 6,312,334 B1 | 11/2001 | Yoseloff | |
| 6,315,660 B1 | 11/2001 | DeMar et al. | |
| 6,315,664 B1 | 11/2001 | Baerlocher et al. | |
| 6,328,649 B1 | 12/2001 | Randall et al. | |
| 6,346,043 B1 | 2/2002 | Colin et al. | |
| 6,347,996 B1 | 2/2002 | Gilmore et al. | |
| 6,364,768 B1 | 4/2002 | Acres et al. | |
| 6,406,369 B1 | 6/2002 | Baerlocher et al. | |
| 6,435,511 B1 | 8/2002 | Vancura et al. | |
| 6,443,837 B1 | 9/2002 | Jaffe et al. | |
| 6,491,584 B2 | 12/2002 | Graham et al. | |
| 6,494,785 B1 | 12/2002 | Gerrard et al. | |
| 6,547,242 B1 | 4/2003 | Sugiyama et al. | |
| 6,599,193 B2 | 7/2003 | Baerlocher et al. | |
| 6,648,754 B2 | 11/2003 | Baerlocher et al. | |
| 6,796,899 B2 | 9/2004 | Baerlocher | |
| 6,796,900 B2 | 9/2004 | Baerlocher et al. | |
| 6,808,452 B2 | 10/2004 | Baerlocher et al. | |
| 6,960,132 B2 | 11/2005 | Baerlocher et al. | |
| 7,070,505 B2 | 7/2006 | Vancura et al. | |
| 7,121,943 B2 | 10/2006 | Baerlocher et al. | |
| 7,297,059 B2 | 11/2007 | Vancura et al. | |
| 7,357,716 B2 | 4/2008 | Marks et al. | |
| 7,381,134 B2 | 6/2008 | Baerlocher et al. | |
| 7,597,620 B2 | 10/2009 | Webb et al. | |
| 7,597,621 B2 * | 10/2009 | Baerlocher | 463/28 |
| 7,666,093 B2 | 2/2010 | Lafky et al. | |
| 7,682,248 B2 | 3/2010 | Baerlocher et al. | |
| 7,780,520 B2 | 8/2010 | Baerlocher | |
| 7,841,939 B2 | 11/2010 | Baerlocher et al. | |
| 7,914,377 B2 | 3/2011 | Benbrahim | |
| 7,963,845 B2 | 6/2011 | Baerlocher | |
| 2002/0142822 A1 * | 10/2002 | Baerlocher et al. | 463/16 |
| 2003/0040360 A1 * | 2/2003 | Kaminkow | 463/25 |
| 2003/0162578 A1 * | 8/2003 | Baerlocher et al. | 463/16 |
| 2003/0162584 A1 * | 8/2003 | Hughs-Baird et al. | 463/20 |
| 2003/0224846 A1 * | 12/2003 | Baerlocher | 463/16 |
| 2004/0048644 A1 | 3/2004 | Gerrard et al. | |
| 2005/0037840 A1 | 2/2005 | Baerlocher | |
| 2005/0054413 A1 * | 3/2005 | Randall et al. | 463/16 |
| 2006/0025195 A1 | 2/2006 | Pennington et al. | |
| 2006/0172791 A1 * | 8/2006 | Wolf | 463/16 |
| 2007/0054733 A1 | 3/2007 | Baerlocher | |
| 2007/0060271 A1 | 3/2007 | Cregan et al. | |
| 2007/0060321 A1 * | 3/2007 | Vasquez et al. | 463/27 |
| 2007/0184887 A1 | 8/2007 | Cannon | |
| 2007/0298875 A1 * | 12/2007 | Baerlocher et al. | 463/27 |
| 2008/0039191 A1 | 2/2008 | Cuddy | |
| 2008/0090651 A1 | 4/2008 | Baerlocher | |
| 2008/0108430 A1 | 5/2008 | Evans | |
| 2008/0108431 A1 | 5/2008 | Cuddy et al. | |
| 2008/0113779 A1 | 5/2008 | Cregan | |
| 2008/0183535 A1 | 7/2008 | Kahana | |
| 2008/0274790 A1 | 11/2008 | Cannon | |
| 2009/0042645 A1 * | 2/2009 | Graham et al. | 463/27 |
| 2009/0088244 A1 | 4/2009 | Nicely et al. | |
| 2009/0111561 A1 | 4/2009 | Dewaal et al. | |
| 2009/0124362 A1 | 5/2009 | Cuddy et al. | |
| 2009/0124363 A1 | 5/2009 | Baerlocher et al. | |
| 2009/0124364 A1 | 5/2009 | Cuddy et al. | |
| 2010/0120498 A1 | 5/2010 | Cuddy et al. | |
| 2010/0261524 A1 | 10/2010 | Pawloski et al. | |
| 2011/0003636 A1 * | 1/2011 | Thomas et al. | 463/27 |
| 2011/0003637 A1 | 1/2011 | LeFever | |
| 2011/0053676 A1 | 3/2011 | Wolf et al. | |
| 2011/0111843 A1 | 5/2011 | Nicely et al. | |
| 2011/0118011 A1 | 5/2011 | Filipour et al. | |

* cited by examiner

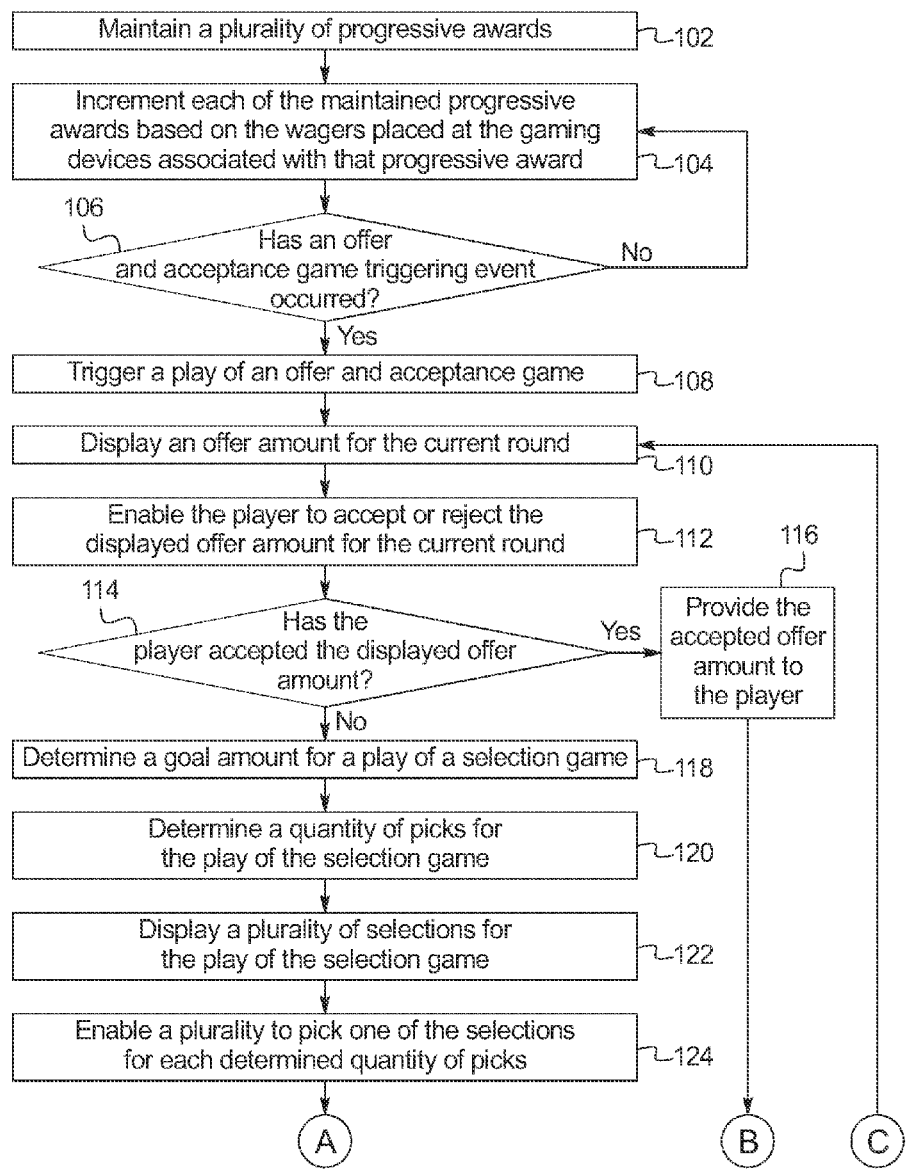

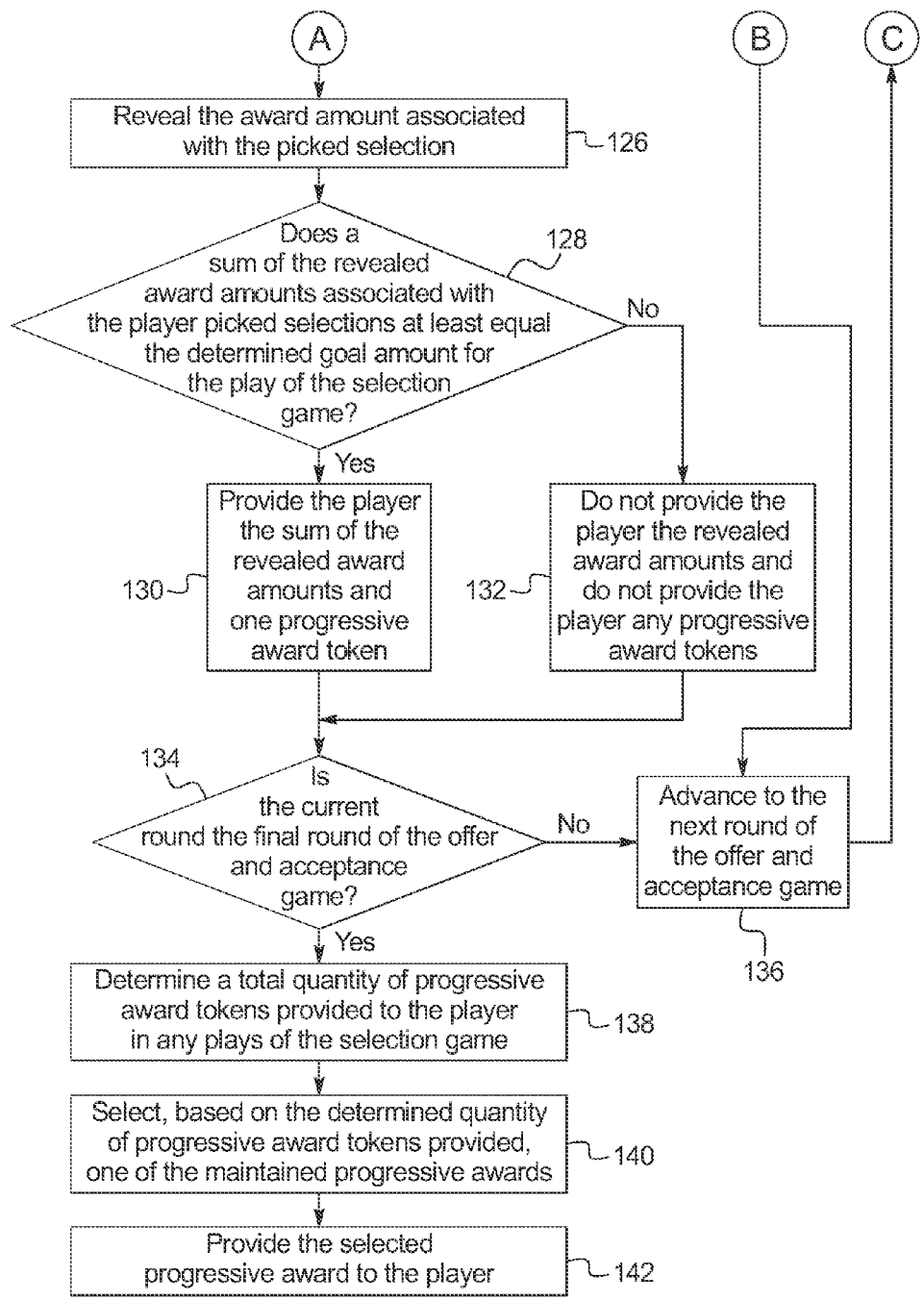

FIG. 2A

| Number | Quantity of Picks | Dist % |
|---|---|---|
| 1 |  | 0.00% |
| 2 |  | 0.00% |
| 3 | 1 | 4.00% |
| 4 | 2 | 8.00% |
| 5 | 3 | 12.00% |
| 6 | 4 | 16.00% |
| 7 | 5 | 20.00% |
| 8 | 6 | 24.00% |
| 9 | 3 | 12.00% |
| 10 | 1 | 4.00% |
|  | 25 | 100.00% |

FIG. 2B

| Award Amount | Award Count | Count % |
|---|---|---|
| 10 | 13 | 65.00% |
| 20 | 5 | 25.00% |
| 30 | 1 | 5.00% |
| 40 | 1 | 5.00% |
| Total | 20 | 100.00% |

FIG. 3A

| Progressive Award | Progressive Award Value | Quantity of Progressive Award Tokens |
|---|---|---|
| 144a — Progressive Award A | $567 | 0-3 |
| 144b — Progressive Award B | $5,045 | 4 |
| 144c — Progressive Award C | $50,023 | 5 |

Your offer for the first round is 50 credits.

Would you like to accept or reject this offer?

Offer Amount: 50 (150a)

Accept Offer (152)  Reject Offer (154)

| Accepted Offers | Selection Game Picks | Selection Game Awards | Progressive Award Tokens | Round | Total Award |
|---|---|---|---|---|---|
| | | | 0 (146) | 1 (148a) | |

FIG. 3B

| | Progressive Award | Progressive Award Value | Quantity of Progressive Award Tokens |
|---|---|---|---|
| 144a | Progressive Award A | $567 | 0-3 |
| 144b | Progressive Award B | $5,045 | 4 |
| 144c | Progressive Award C | $50,023 | 5 |

Now that you have
accepted the offer of
50 credits, time to move
onto the second round.

| Offer Amount | Accept Offer | Reject Offer |
|---|---|---|
| 50 | | |
| 150a | 152 | 154 |

| Accepted Offers | Selection Game Picks | Selection Game Awards | Progressive Award Tokens | Round | Total Award |
|---|---|---|---|---|---|
| 50 | | 0 | 0 | 1 | 50 |
| | | | 146 | 148a | |

FIG. 3C

| Progressive Award | Progressive Award Value | Quantity of Progressive Award Tokens |
|---|---|---|
| Progressive Award A | $567 | 0-3 |
| Progressive Award B | $5,045 | 4 |
| Progressive Award C | $50,023 | 5 |

Your offer for the second round is 70 credits.

Would you like to accept or reject this offer?

| Offer Amount | Accept Offer | Reject Offer |
|---|---|---|
| 70 | | |

| Accepted Offers | Selection Game Picks | Selection Game Awards | Progressive Award Tokens | Round | Total Award |
|---|---|---|---|---|---|
| 50 | | 0 | 0 | 2 | 50 |

FIG. 3D

| | Progressive Award | Progressive Award Value | Quantity of Progressive Award Tokens |
|---|---|---|---|
| 144a | Progressive Award A | $567 | 0-3 |
| 144b | Progressive Award B | $5,045 | 4 |
| 144c | Progressive Award C | $50,023 | 5 |

Now that you have
rejected the offer of
70 credits, it is time to
play a selection game.

| Offer Amount | | |
|---|---|---|
| 70 | Accept Offer | Reject Offer |
| 150b | 152 | 154 |

| Accepted Offers | Selection Game Picks | Selection Game Awards | Progressive Award Tokens | Round | Total Award |
|---|---|---|---|---|---|
| 50 | | 0 | 0 | 2 | 50 |
| | | | 146 | 148b | |

FIG. 3E

| | Progressive Award | Progressive Award Value | Quantity of Progressive Award Tokens |
|---|---|---|---|
| 144a | Progressive Award A | $567 | 0-3 |
| 144b | Progressive Award B | $5,045 | 4 |
| 144c | Progressive Award C | $50,023 | 5 |

| 156a | 156b | 10 (156c) | 156d | 156e | 10 (156f) | 156g | 156h |
|---|---|---|---|---|---|---|---|
| 156i | 10 (156j) | 156k | 156l | 156m | 156n | 156o | 156p |
| 156q | 156r | 156s | 156t | 156u | 156v | 156w | 156x |
| 156y | 156z | 156aa | 10 (156bb) | 156cc | 156dd | 156ee | 156ff |
| 156gg | 156hh | 30 (156ii) | 156jj | 156kk | 20 (156ll) | 156mm | 156nn |

Your total revealed award of 90 credits exceeds your selection game goal of 70 credits. You win the revealed award of 90 credits and 1 progressive award token. Time to move onto the third round.

| Accepted Offers | Selection Game Picks | Selection Game Awards | Progressive Award Tokens | Round | Total Award |
|---|---|---|---|---|---|
| 50 | 6 | 90 | 1 | 2 | 140 |

FIG. 3F

| Progressive Award | Progressive Award Value | Quantity of Progressive Award Tokens |
|---|---|---|
| 144a — Progressive Award A | $567 | 0-3 |
| 144b — Progressive Award B | $5,045 | 4 |
| 144c — Progressive Award C | $50,023 | 5 |

Your offer for the third round is 90 credits.

Would you like to accept or reject this offer?

Offer Amount: 90 (150c)

Accept Offer (152)  Reject Offer (154)

| Accepted Offers | Selection Game Picks | Selection Game Awards | Progressive Award Tokens | Round | Total Award |
|---|---|---|---|---|---|
| 50 |  |  | 1 (146) | 3 (148c) | 140 |

FIG. 3G

| Progressive Award | Progressive Award Value | Quantity of Progressive Award Tokens |
|---|---|---|
| Progressive Award A | $567 | 0-3 |
| Progressive Award B | $5,045 | 4 |
| Progressive Award C | $50,023 | 5 |

Now that you have
rejected the offer of
90 credits, it is time to play
another selection game.

Offer Amount: 90

Accept Offer

Reject Offer

| Accepted Offers | Selection Game Picks | Selection Game Awards | Progressive Award Tokens | Round | Total Award |
|---|---|---|---|---|---|
| 50 |  | 90 | 1 | 3 | 50 |

FIG. 3H

| Progressive Award | Progressive Award Value | Quantity of Progressive Award Tokens |
|---|---|---|
| Progressive Award A | $567 | 0-3 |
| Progressive Award B | $5,045 | 4 |
| Progressive Award C | $50,023 | 5 |

| 10 156a | 156b | 156c | 156d | 10 156e | 156f | 156g | 10 156h |
| 156i | 156j | 156k | 156l | 156m | 156n | 156o | 156p |
| 156q | 10 156r | 156s | 156t | 156u | 156v | 156w | 10 156x |
| 156y | 156z | 156aa | 156bb | 10 156cc | 156dd | 156ee | 156ff |
| 156gg | 10 156hh | 156ii | 156jj | 156kk | 156ll | 10 156mm | 156nn |

Your total revealed award of 80 credits for the selection game is less than your selection game goal of 90 credits. You do not win any awards for this round. Time to move onto the fourth round.

| Accepted Offers | Selection Game Picks | Selection Game Awards | Progressive Award Tokens | Round | Total Award |
|---|---|---|---|---|---|
| 50 | 8 | | 1 | 3 | 140 |

FIG. 3I

| | Progressive Award | Progressive Award Value | Quantity of Progressive Award Tokens |
|---|---|---|---|
| 144a | Progressive Award A | $567 | 0-3 |
| 144b | Progressive Award B | $5,045 | 4 |
| 144c | Progressive Award C | $50,023 | 5 |

Congratulations, you win Progressive Award A currently valued at $567.00. This progressive award is in addition to the two accepted offers of 180 credits and the total selection game revealed amounts of 290 credits.

| Accepted Offers | Selection Game Picks | Selection Game Awards | Progressive Award Tokens | Round | Total Award |
|---|---|---|---|---|---|
| 180 | | 290 | 2 | 5 | 1037 |

| Round | 1 | 2 | 3 | 4 | 5 |
|---|---|---|---|---|---|
| Quota | 50 | 70 | 90 | 130 | 170 |
| Gold Won | 80 | 0 | 160 | 150 | ?? |
| Pick Axes | ⬉ | ✕ | ⬉ | ⬉ | ?? |

GAMING SYSTEM AND METHOD FOR PROVIDING AN OFFER AND ACCEPTANCE GAME WITH PROGRESSIVE AWARDS ASSOCIATED WITH A QUANTITY OF PROGRESSIVE TOKENS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

One such type of secondary or bonus game is an offer and acceptance game which enables players to accept or decline multiple award offers. One such gaming device provides the player with a quantity of offers and a final award. When an offer is given, the player may accept or reject the offer. If the player accepts an offer, the player receives the accepted offer amount and the bonus game terminates. If the player declines an offer, the game generates another offer for the player. The player is automatically provided with the last selected offer if the player rejects each of the quantity of previous offers. In this known offer/acceptance game, when the player rejects an offer, the player risks a current or guaranteed award for a higher value award. The game may instead provide a lower award. The game thus creates a risk for the player. Enabling a player to pick from different risk based alternatives and then enabling the player to accumulate awards or offers from the selected alternatives provides excitement and enjoyment to the player. A continuing need exists to provide offer/acceptance games that enable a player to weigh options and explore the consequences of selecting those options where the player may accumulate awards or offers.

Progressive awards associated with gaming machines are also known. In one form, a progressive award is an award amount which includes an initial amount funded by a casino and an additional amount funded through a portion of each wager made on the progressive gaming machines. The progressive award grows in value as players play the gaming machines and more portions of these players' wagers are allocated to the progressive award. When a player obtains a winning symbol or winning symbol combination associated with the progressive award, the accumulated progressive award is provided to the player. After the progressive award is provided to the player, the amount of the next progressive award is reset to the initial value and a portion of each subsequent wager on a gaming machine associated with a progressive award is allocated to the next progressive award. Similar to gaming machines which employ offer and acceptance games, gaming machines which employ progressive awards provide excitement and enjoyment for players. A continuing need exists to provide progressive awards to players and specifically to provide progressive awards to players in association with an offer/acceptance game.

SUMMARY

The present disclosure relates generally to gaming systems and methods for providing a progressive award in association with an offer and acceptance game.

In various embodiments, the gaming system disclosed herein maintains a plurality of progressive awards in a multi-level progressive award ("MLP") configuration. Each of the progressive awards of the MLP is associated with a designated quantity of progressive award tokens.

In various embodiments, upon an occurrence of a suitable triggering event, the gaming system initiates an offer and acceptance game. The offer and acceptance game includes a plurality of rounds or levels. The gaming system associates each round or level with a progressive award token such that a progressive award token is available to be accumulated by the player for each round or level.

In operation of the offer and acceptance game of various embodiments, for each round or level, the gaming system offers the player an award amount, such as an amount of credits, and enables the player to accept or reject the offered award amount.

If the player accepts the offered award amount, the gaming system provides the player the offered award amount and proceeds to any subsequent round or level without providing any progressive award tokens to the player. That is, if a player accepts the offered award amount for a round of the offer and acceptance game, the player forgoes an opportunity to accumulate any progressive award tokens for that round of the offer and acceptance game.

On the other hand, if the player rejects the offered award amount, the gaming system proceeds to a rejected offer supplemental game or event to determine if the player is provided any awards (including any progressive award tokens) in association with the rejected offer. In one such embodiment, the rejected offer supplemental game or event is a selection game wherein the gaming system sets or establishes a goal amount for the selection game. In one embodiment, the gaming system establishes the selection game goal amount based on the rejected offer, such as by setting the selection game goal amount to a goal amount at least equal to the rejected award amount. In one such embodiment, for each offer the player rejects in a play of the offer and acceptance game (i.e., each successive play of a selection game), the gaming system sets or establishes a higher goal amount such that the player has different probabilities of achieving success in different, sequential plays of the selection game.

In operation of the selection game, the gaming system displays to the player a plurality of selections wherein each of the selections is associated with an award amount or value. The gaming system determines a quantity of picks of the selections for the player. For each determined pick, the gaming system enables the player to pick one of the selections and reveals the award amount associated with the picked selection.

After the player has picked one of the selections for each of the determined quantity of picks, the gaming system determines if a sum of the revealed award amounts (i.e., the total revealed award amount associated with each of the picked selections) is at least equal to the set goal amount for the selection game.

If the sum of the revealed award amounts is less than the set goal amount for the selection game, the gaming system does not provide the player any award value for that play of the selection game. Moreover, if the sum of the revealed award amounts is less than the set goal amount for the selection game, the gaming system does not provide any progressive award tokens to the player for the play of the selection game. Put differently, if the player rejects an offer and subsequently fails to successfully complete the play of the supplemental game associated with the rejected offer, for that rejected offer (i.e., for that round or level of the offer and acceptance game), the gaming system: (i) does not provide the player any award associated with that play of the supplemental game, and (ii) does not provide the player any progressive award tokens.

On the other hand, if the sum of the revealed award amounts reaches or is at least equal to the set goal amount for the selection game, the gaming system provides the player: (i) the accumulated revealed award amount and (ii) one progressive award token. Put differently, if the player rejects an offer and subsequently successfully completes the play of the supplemental game associated with the rejected offer, for that rejected offer (i.e., for that round or level of the offer and acceptance game), the gaming system: (i) provides the player any award associated with that play of the supplemental game, and (ii) provides the player at least one progressive award token. Accordingly, if the player rejects an offer for a round or level of the offer and acceptance game, as a result of the rejected offer supplemental game (e.g., the selection game) played for that round or level, the gaming system either provides the player two different types of benefits (i.e., an award based on the play of the rejected offer supplemental game and a progressive award token) or does not provide the player any award at all. Such decisions of either accepting a known offer or rejecting a known offer for either winning two different types of benefits or winning no awards provides an increased level of excitement and enjoyment to players.

After picking a selection for each of the determined quantity of picks of the selection game played in association with a rejected offer (and either winning an award and a progressive award token or not winning any awards or any progressive award tokens), the gaming system proceeds to any subsequent round of the offer and acceptance game. It should thus be appreciated that the gaming system enables the player to participate in each round or level of the offer and acceptance game regardless of the result or outcome of any particular round or level.

After either accepting a final offer or participating in a selection game for the final round or level of the offer and acceptance game, the gaming system determines, based on the player's total quantity of accumulated progressive award tokens, one of the progressive awards of the MLP to provide to the player. Following providing the player the determined progressive award, the gaming system concludes the play of the offer and acceptance game. Such a configuration thus provides that the player's individual decisions regarding which offers to accept or reject, combined with the player's individual decisions regarding the play of a supplemental game (e.g., the player's individual decisions regarding which selections to pick in each play of the selection game) determine which progressive award the player is ultimately provided.

Additional features and advantages are described in, and will be apparent from, the following Detailed Description and the figures.

BRIEF DESCRIPTION OF THE FIGURES

FIG. 1 is a flow chart an example process for operating a gaming system providing one embodiment of the offer and acceptance game disclosed herein.

FIGS. 2A and 2B are tables of different distributions of awards and quantities of picks utilized in association with one embodiment of the selection game disclosed herein.

FIGS. 3A, 3B, 3C, 3D, 3E, 3F, 3G, 3H and 3I are front views of one embodiment of the gaming system disclosed herein illustrating a play of a plurality of rounds of a multi-round offer and acceptance game.

DETAILED DESCRIPTION

Offer and Acceptance Game

Figure 4:
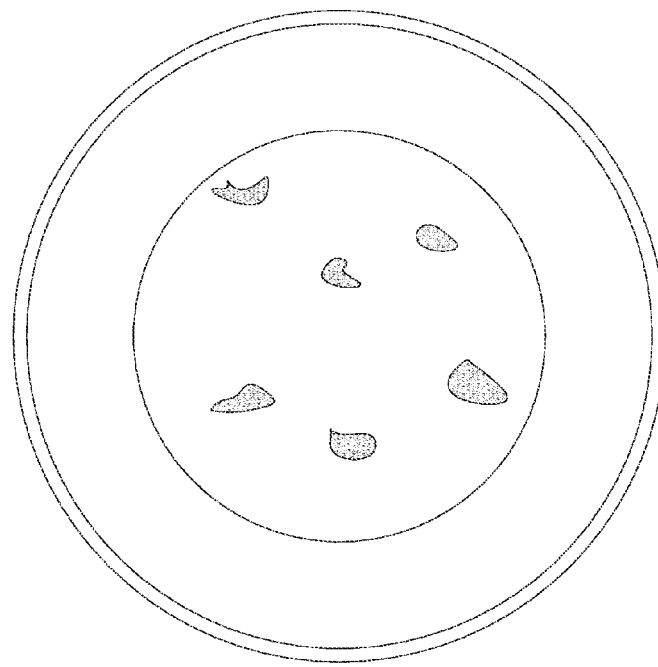
FIG. 4 is a front view of one embodiment of one theme of the offer and acceptance game disclosed herein illustrating the results of each round of the offer and acceptance game.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, the gaming system maintains a plurality of progressive awards as indicated in block 102 of FIG. 1. In one such embodiment, a plurality of gaming devices at one or more gaming sites are networked to the central server in a progressive configuration with the plurality of maintained progressive awards. In another such embodiment, a single or stand-alone gaming device in the gaming system is associated with or otherwise dedicated to the plurality of maintained progressive awards. In another such embodiment, one or more internet accessible dedicated gaming sites are associated with the maintained progressive awards.

In one embodiment, one or more of the progressive awards start at different levels and increment or increase until provided to a player (as described below). For example, the gaming system maintains three progressive awards, wherein the first progressive award has a first reset value (i.e., an initial start value) of $500, the second progressive award has a second reset value of $5,000 and the third progressive award has a third reset value of $50,000.

Each of the progressive awards is associated with a designated quantity of progressive award tokens or units. In one such embodiment, each of the progressive awards is associated with a different quantity of progressive award tokens. In another such embodiment, one or more of the progressive awards are each associated with a quantity of progressive award tokens and one or more of the progressive awards are each associated with a range of quantities of progressive award tokens. It should be appreciated that as described below, the quantity of progressive award tokens a player accumulates during the play of an offer and acceptance game determines which of the plurality of maintained progressive awards the gaming system will provide to the player in association with the offer and acceptance game. It should be further appreciated that the quantity of progressive award tokens associated with one or more of the progressive awards is based, at least in part, on the quantity of rounds or levels of the offer and acceptance game.

Each of the progressive awards is also associated with a progressive award contribution rate which represent the portion of each wager placed (or the portion of each designated wager, such as a maximum wager, placed) that is allocated to the progressive award. Continuing with the above example, a total of 2% of each wager placed (or 2% of each designated wager placed) is allocated to the three maintained progressive awards, wherein this 2% is broken or divided up into a first progressive award contribution rate of 0.25% associated with the first maintained progressive award, a second progressive award contribution rate of 0.50% associated with the second maintained progressive award and a third progressive award contribution rate of 1.25% associated with the third maintained progressive award.

As seen in block 104 of FIG. 1, the gaming system increments or grows each of the maintained progressive awards based on the wagers placed at the gaming devices associated with that progressive award. Building on the above-described example, for each $1.00 wagered on a gaming device associated with the three maintained progressive awards, the gaming system increments the first progressive award by $0.0025 (i.e., $1.00× the first progressive award contribution rate of 0.025% associated with the first progressive award), the gaming system increments the second progressive award by $0.005 (i.e., $1.00× the second progressive award contribution rate of 0.05% associated with the second progressive award), and the gaming system increments the third progressive award by $0.0125 (i.e., $1.00× the third progressive award contribution rate of 1.25% associated with the third progressive award). In this example, based on these progressive award contribution rates, the first progressive award (which is associated with the lowest start-up value) will increment or grow quicker than at least the third progressive award (which is associated with the highest start-up value).

In addition to maintaining and incrementing the progressive awards, the gaming system monitors for an occurrence of an offer and acceptance game triggering event as indicated in diamond 106. In this embodiment, if the gaming system determines that no offer and acceptance game triggering event has occurred, the gaming system returns to block 104 and continues to increment the progressive awards as described above.

On the other hand, if the gaming system determines that an offer and acceptance triggering event has occurred, as indicated in block 108 of FIG. 1, the gaming system triggers a play of an offer and acceptance game (and specifically triggers a play of a first round of a multi-round offer and acceptance game). As described below, in one embodiment, the offer and acceptance game includes a plurality of rounds or levels wherein each round or level represents an opportunity for a player to either accept a known offer (and forfeit a chance to accumulate a progressive award token) or reject the known offer for a chance to win an award and accumulate a progressive award token.

In one embodiment, the offer and acceptance game is a secondary or bonus game wherein an offer and acceptance game triggering event occurs based on a displayed event associated with a wagered on play of a primary game. In various embodiments, a generation of a designated symbol (or sub-symbol) or a designated set of symbols (or sub-symbols) over one or more plays of a primary game causes an offer and acceptance game triggering event to occur. In another such embodiment wherein the offer and acceptance game is a secondary or bonus game, an offer and acceptance game triggering event occurs based on an event independent of any displayed event associated with a wagered on play of a primary game. For example, after a designated period of time, the gaming system causes an offer and acceptance game triggering event to occur. In another such embodiment, the offer and acceptance game is a primary game wherein an offer and acceptance game triggering event occurs upon a player placing a wager to play the offer and acceptance game.

In one embodiment, the gaming system displays an offer amount for the current round or level as indicated in block 110. In one embodiment, each of the different rounds or levels are associated with a different offer amount. In one such embodiment, the higher the round or level of the offer and acceptance game, the higher the offer amount displayed to the player. In another embodiment, a plurality of the different rounds or levels are associated with a plurality of different offer amounts. In another embodiment, a plurality of the different rounds or levels are associated with the same offer amount.

As indicated in block 112, the gaming system then enables the player to accept or reject the displayed offer amount for the current round or level. If the gaming system determines that the player accepted the displayed offer amount, the gaming system provides the accepted offer amount to the player as indicated in diamond 114 and block 116. It should be appreciated that if the player accepts an offer for a round or level of the offer and acceptance game, the gaming system does not provide the player any progressive award token in association with the accepted offer. That is, the player's decision to accept an offer for a designated round coincides with the player's decision to forgo obtaining any progressive award token for that designated round. Accordingly, the player's choice to obtain a known award amount is associated with a forfeiture of a chance to accumulate a progressive award token.

On the other hand, if the gaming system determines that the player rejected (i.e., did not accept) the displayed offer amount for the current round or level, the gaming system enables the player to participate in a rejected offer supplemental game for an opportunity to win an award amount and a progressive award token. In one embodiment, the rejected offer supplemental game is a selection game wherein if the gaming system determines that the player rejected the displayed offer amount for the current round or level, the gaming system determines a goal amount for a play of a selection game as indicated in diamond 114 and block 118. In one such embodiment, the determined goal amount for the play of the selection game is equal to (or substantially equal to) the rejected offer amount. In another such embodiment, the determined goal amount for the play of the selection game is greater than the rejected offer amount. In certain embodiments wherein the higher the round or level of the offer and acceptance game, the higher the offer amount displayed to the player, the higher the round or level of the offer and acceptance game, the higher the determined goal amount for a play of the selection game. In these embodiments, as a player's success in each play of the selection is determined by reaching or exceeding the determined goal amount for that play of the selection game, player's will encounter relatively higher probabilities of successfully completing the selection games associated with the rejected offer amounts of earlier rounds or levels of the offer and acceptance game (compared to successfully completing the selection games associated with the rejected offer amounts of later rounds or levels of the offer and acceptance game).

After determining the goal amount for the play of the selection game, the gaming system determines a quantity of picks for the play of the selection game as indicated in block 120. In one embodiment, the gaming system determines a quantity of picks from a range of quantities of picks. In one such embodiment, as seen in FIG. 2A, the gaming system randomly selects a quantity of picks from a weighted table of quantities of picks. In one such embodiment, the gaming system utilizes the same range of quantities of picks (or the same weighted table of quantities of picks) for each of the rounds of the offer and acceptance game. In another such embodiment, the gaming system utilizes different ranges of quantities of picks (or different weighted tables of quantities of picks) for each of a plurality of the rounds of the offer and acceptance game.

Following the determination of a quantity of picks for the play of the selection genie, the gaming system displays a plurality of selections for the selection game as indicated in block 122 of FIG. 1. In this embodiment, each of the selections is associated with an award amount. In one embodiment, the gaming system determines, for each selection, which award amount to associated with that selection from a range of award amounts. In one such embodiment, as seen in FIG. 2B, the gaming system randomly selects an award amount from a weighted table of award amounts to associate with each selection. In one such embodiment, the gaming system utilizes the same range of award amounts (or the same weighted table of award amounts) to associate with the selections for each of the rounds of the offer and acceptance game. In another such embodiment, the gaming system utilizes different ranges of award amounts (or different weighted tables of award amounts) to associate with the selections for each of a plurality of the rounds of the offer and acceptance game.

After determining a quantity of picks and displaying the plurality of selections, for each of the determined quantity of picks, the gaming system enables the player to pick one of the selections and reveals the award amount associated with the picked selection as indicated in blocks 124 and 126 of FIG. 1. The gaming system then determines if the sum of the revealed award amounts associated with the player picked selections at least equals the determined goal amount for that play of the selection game as indicated in diamond 128.

If the gaming system determines that the sum of the revealed award amounts associated with the player picked selections at least equals the determined goal amount, the gaming system provides the player the sum of the revealed award amounts and one progressive award token as indicated in block 130. Accordingly, as a reward for rejecting the known offer amount and successfully playing the selection game for one round or level of the offer and acceptance game, the gaming system provides the player a first type of benefit or award (i.e., the revealed award amounts) and a second type of benefit or award (i.e., the progressive award token).

On the other hand, if the gaming system determines that the sum of the revealed award amounts associated with the player picked selections is less than the determined goal amount, the gaming system does not provide the player the revealed award amounts and does not provide the player any progressive award tokens as indicated in block 132. Accordingly, as a consequence for rejecting the known offer amount and unsuccessfully playing the selection game for one round or level of the offer and acceptance game, the gaming system does not provide the player any award (including any progressive award tokens) for that round or level.

Following (i) providing the player the accepted offer amount, (ii) providing the player multiple benefits or awards for a successful play of the selection game, or (iii) not providing the player any benefits or awards for an unsuccessful play of the selection game, the gaming system determines if the current round or level is the final round or level of the offer and acceptance game as indicated in diamond 134. If the gaming system determines that the current round or level is not the final round or level (i.e., at least one unplayed round or level remains), the gaming system advances to the next round or level of the offer and acceptance game as indicated in block 136. The gaming system then returns to block 110 and proceeds as described above with displaying an offer amount for the current round (i.e., the advanced to round). That is, regardless of the player's decision to accept or reject an offer for a round or level of the offer and acceptance game and further regardless of the player's degree of success for a play of a rejected offer supplemental game associated with a rejected offer, the gaming system enables the player to participate in each round or level of the offer and acceptance game. Such a configuration ensures at least a minimum amount of play time for the player (compared to known games which terminate the game when the player is unsuccessful for any stage of the game).

On the other hand, if the gaming system determines that the current round or level is the final round or level (i.e., no unplayed rounds or levels remain), the gaming system determines a total quantity of progressive award tokens provided to the player in any plays of the selection game as indicated in block 138. The gaming system then selects, based on the determined quantity of progressive award tokens provided, one of the maintained progressive awards and provides the selected progressive award to the player as indicated in blocks 140 and 142. Following the providing of a maintained progressive award, the gaming system terminates the play of the triggered offer and acceptance game. Accordingly, the offer and acceptance game of the present disclosure provides that the player's individual decisions regarding which offers to accept or reject, combined with the player's individual decisions regarding each play of a rejected offer supplemental game (e.g., the player's individual decisions regarding which selections to pick in each play of the selection game) determine which progressive award the player is ultimately provided.

In one example embodiment of the offer and acceptance game disclosed herein, as seen in FIGS. 3A to 3I, the gaming system maintains three progressive awards 144 which are each associated with a quantity of progressive award tokens 146. Specifically, the first progressive award 144a is associated with a range of zero progressive award tokens to three progressive award tokens, the second progressive award 144b is associated with four progressive award tokens and the third progressive award 144c is associated with five progressive award tokens.

In operation of the triggered offer and acceptance game, as seen in FIGS. 3A and 3B, for a first round 148a of five rounds of a triggered multi-round offer and acceptance game, the gaming system offers the player an offer award of fifty credits 150a which the player accepts using the accept offer input 152. Accordingly, the gaming system provides the player the accepted award of fifty credits (and the gaming system does not provide the player any progressive award tokens for this first round of the offer and acceptance game). In this example, the gaming system displays appropriate messages such as "YOUR OFFER FOR THE FIRST ROUND IS 50 CREDITS", "WOULD YOU LIKE TO ACCEPT OR REJECT THIS OFFER" and "NOW THAT YOU HAVE ACCEPTED THE OFFER OF 50 CREDITS, TIME TO MOVE ONTO THE SECOND ROUND" to the player visually, or through suitable audio or audiovisual displays.

Following the completion of the first round, the gaming system proceeds to a second round 148b of the offer and acceptance game. In this second round, as seen in FIGS. 3C and 3D, the gaming system offers the player an offer award of seventy credits 150b which the player rejects using the reject offer input 154. As seen in this example, as the offer and acceptance game proceeds from round to round, the amount offered to the player for each round increases to provide more excitement and enjoyment to the player. In this example, the gaming system displays appropriate messages such as "YOUR OFFER FOR THE SECOND ROUND IS 70 CREDITS", "WOULD YOU LIKE TO ACCEPT OR REJECT THIS OFFER" and "NOW THAT YOU HAVE REJECTED THE OFFER OF 70 CREDITS, IT IS TIME TO PLAY A SELECTION GAME" to the player visually, or through suitable audio or audiovisual displays.

As seen in FIG. 3E, this rejection of the offer for the second round triggers a first play of a selection game. This first play of the selection game includes a plurality of selections 156 (and specifically 156a to 156ll) associated with a plurality of masked award amounts 158 (and specifically 158a to 158ll). This first play of the selection game is also associated with a determined goal amount of seventy. In this first play of the selection game, the gaming system provides the player six picks 160a which the player uses to pick six selections (selection 156c associated with an award of ten credits 158c, selection 156f associated with an award of ten credits 158f, selection 156j associated with an award of ten credits 158j, selection 156z associated with an award of ten credits 158z, selection 156gg associated with an award of thirty credits selection 158gg and selection 156jj associated with an award of twenty credits 158jj) which reveal a total award of ninety credits. Accordingly, as the player has successfully completed the selection game for this round of the offer and acceptance game, the gaming system provides the player the total revealed award of ninety credits and the gaming system further provides the player a progressive award token 160 for this second round of the offer and acceptance game. In this example, the gaming system displays appropriate messages such as "YOUR TOTAL REVEALED AWARD OF 90 CREDITS FOR THE SELECTION GAME EXCEEDS YOUR SELECTION GAME GOAL OF 70 CREDITS. YOU WIN THE REVEALED AWARD OF 90 CREDITS AND 1 PROGRESSIVE AWARD TOKEN" and "TIME TO MOVE ONTO THE THIRD ROUND" to the player visually, or through suitable audio or audiovisual displays.

Following the completion of the second round, the gaming system proceeds to a third round 148c of the offer and acceptance game. In this third round, as seen in FIGS. 3F and 3G, the gaming system offers the player an offer award of ninety credits 150c which the player rejects using the reject offer input 154. As seen in this example, as the offer and acceptance game proceeds from round to round, the amount offered to the player for each round increases to provide more excitement and enjoyment to the player. In this example, the gaming system displays appropriate messages such as "YOUR OFFER FOR THE THIRD ROUND IS 90 CREDITS", "WOULD YOU LIKE TO ACCEPT OR REJECT THIS OFFER" and "NOW THAT YOU HAVE REJECTED THE OFFER OF 90 CREDITS, IT IS TIME TO PLAY ANOTHER SELECTION GAME" to the player visually, or through suitable audio or audiovisual displays.

As seen in FIG. 3H, this rejection of the offer for the third round triggers another selection game, wherein this play of the selection game is associated with a determined goal amount of ninety credits. As seen in this example, as the offer and acceptance game proceeds from round to round, the selection game goal amount for each round increases to provide more excitement and enjoyment to the player. In this play of the selection game, the gaming system provides the player eight picks 160b which the player uses to pick eight selections (selection 156a associated with an award of ten credits 158a, selection 156e associated with an award of ten credits 158e, selection 156h associated with an award of ten credits 158h, selection 156p associated with an award of ten credits 158p, selection 156v associated with an award of ten credits 158v, selection 156aa associated with an award of ten credits 158aa, selection 156ff associated with an award of ten credits 158ff, and selection 156kk associated with an award of ten credits 158kk) which reveal a total award of eighty credits.

Continuing with this example, as the player has unsuccessfully completed the selection game for this round of the offer and acceptance game, the gaming system does not provide the player any award (i.e., the player is not provided the revealed eighty credits) or any progressive award token for this third round of the offer and acceptance game. In this example, the gaming system displays appropriate messages such as "YOUR TOTAL REVEALED AWARD OF 80 CREDITS FOR THE SELECTION GAME IS LESS THAN YOUR SELECTION GAME GOAL OF 90 CREDITS. YOU DO NOT WIN ANY AWARDS FOR THIS ROUND" and "TIME TO MOVE ONTO THE FOURTH ROUND" to the player visually, or through suitable audio or audiovisual displays.

In this example, after the player accepted the award offer of one-hundred-thirty credits for the fourth round (not shown) and the gaming system provided the player a total revealed award of two-hundred credits and another progressive award token for the fifth round (also not shown), as seen in FIG. 3I, the gaming system determines that the player's two progressive award tokens 146 are associated with the first maintained progressive award 144a. In this example, the gaming system provides the player the first maintained progressive award and concludes the play of the offer and acceptance game. Accordingly, for the play of the triggered offer and acceptance game, as indicated in total award meter 162, the gaming system provided the player a total award of $1037.00 which includes: (i) the first maintained progressive award currently valued at $567.00, (ii) the two accepted offers of one-hundred-eighty-credits (i.e., the accepted offer of fifty credits from the first round+the accepted offer of one-hundred-thirty credits from the fourth round), and (iii) the total revealed award amount of two-hundred-ninety credits (i.e., the total revealed award of ninety credits from the second round+the total revealed award amount of two-hundred credits from the fifth round). In this example, the gaming system displays appropriate messages such as "CONGRATULATIONS, YOU WIN PROGRESSIVE AWARD A CURRENTLY VALUED AT $567" and "THIS PROGRESSIVE AWARD IS IN ADDITION TO THE TWO ACCEPTED OFFERS OF 180 CREDITS AND THE TOTAL SELECTION GAME REVEALED AMOUNTS OF 290 CREDITS".

In one alternative embodiment, the gaming system determines success in one or more plays of the rejected offer supplemental game based on the sum of the player's revealed award offers being less than (or less than or equal to) the determined selection game goal.

In one embodiment, as described above, each play of the selection game associated with each rejected offer is associated with a complete set of selections (which are associated with a complete set of masked award amounts). In another embodiment, two or more plays of the selection game associated with two or more rejected offers are associated with a complete set of selections (which are associated with a complete set of masked award amounts). In this embodiment, the plurality of selections persist between multiple rounds wherein if an award amount associated with a selection is revealed in a first play of the selection game associated with a first rejected offer, that award amount will remain revealed for a second, subsequent play of the selection game associated with a second, subsequently rejected offer.

In one embodiment, as described above, the gaming system provides the player the progressive award associated with the player's quantity of accumulated progressive award tokens. In another embodiment, the gaming system provides the player one or more progressive awards. In an example of this embodiment, if the first maintained progressive award is associated with zero to three progressive award tokens, the second progressive award is associated with four progressive award tokens and the player accumulated four progressive award tokens, the gaming system provides the player both the first progressive award and the second progressive award.

In one embodiment, the gaming system causes at least one display device of the player's gaming device to display the offer and acceptance game. In another embodiment, in addition or in alternative to each gaming device displaying the offer and acceptance game, the gaming system causes one or more community or overhead display devices to display part or all of the offer and acceptance game to one or more other players or bystanders either at a gaming establishment or viewing over a network, such as the internet. In another embodiment, in addition or in alternative to each gaming device displaying the offer and acceptance game, the gaming system causes one or more internet sites to each display the offer and acceptance game such that a player is enabled to log on from a personal web browser. In another such embodiment, the gaming system enables the player to play one or more primary games on one device while viewing the offer and acceptance game from another device. For example, the gaming system enables the player to play one or more primary games on a mobile phone while viewing the status of the offer and acceptance game on a PC desktop or laptop computer.

It should be appreciated that the offer and acceptance game disclosed herein may be displayed in association with one or more themes such as the gold prospector theme wherein the progressive award tokens are pick axes and the selection game awards are amounts of gold as illustrated in FIG. 4 (wherein the player has completed four rounds of the gold prospector themed game). In alternative embodiments, the theme used in association with the offer and acceptance game includes, but is not limited to: a archeological dig theme (e.g., the player is searching for artifacts on a remote archeological dig site, such as the Far East, Great Rift Valley of Africa, Egyptian, Aztec, American West, or Siberia), a picking fruit theme (e.g., the player is in a fruit orchard and the player picks a tree to shake); an ocean fishing theme (e.g., the player casts out a net into the water; a bobbing for apples theme; a jelly bean jar theme (e.g., a jar is fill with red, green and yellow beans and the player is awarded the number of scoops in the jar), an E-Date them (e.g., an 'online dating game' wherein virtual date offers are revealed) or an eating competition theme.

In different embodiments, one or more of the offers associated with one or more plays of the offer and acceptance game include, but are not limited to: credit amounts, promotional credit amounts, player tracking points, modifiers (e.g., multipliers), physical prizes, free spins, progressive awards, a value, non-monetary credits, virtual goods associated with the gaming system, virtual goods not associated with the gaming system, and a modifier.

In different embodiments, one or more of the rejected offer supplemental games associated with one or more of the rounds or levels of an offer and acceptance game include, but are not limited to: a play of any suitable slot game, a play of any suitable free spins or free activations game, a play of any suitable wheel game, a play of any suitable card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, a play of any suitable group game or a play of any other suitable type of game. It should be appreciated that in any of these rejected offer supplemental games, the gaming system determines if the player is successful (i.e., obtain a rejected offer supplemental game outcome that reaches or exceeds a threshold outcome) or unsuccessful (i.e., obtains a rejected offer supplemental game outcome that fails to reach a threshold outcome) in the play of the rejected offer supplemental game and then proceeds to provide the player an award and a progressive award token (if the player is successful) or provide the player no award and no progressive award token (if the player is unsuccessful).

In another embodiment, the offer and acceptance game includes a plurality of stages wherein after an occurrence of an offer and acceptance triggering event, the gaming system enables the player to play through the offer set as described above. In this embodiment, after the player has been provided each of the offers of the currently played offer set, the player advances to another stage and is provided each of the offers of another offer set. In one such embodiment, the player's progress from a previous stage persists over multiple stages. In another such embodiment, the player's progress from a previous stage resets with each stage such that the player is effectively starting over with each stage.

In another embodiment, as mentioned above, an offer and acceptance game triggering event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations.

In another embodiment, as also mentioned above, the gaming system does not provide any apparent reasons to the players for an offer and acceptance game triggering event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one embodiment, an offer and acceptance game triggering event occurs, based on an amount coin-in. In this embodiment, the gaming system determines if an amount of coin-in wagered at one or more gaming devices in the gaming system reaches or exceeds a designated amount of coin-in (i.e., a threshold coin-in amount). Upon the amount of coin-in wagered at one or more gaming devices in the gaming system reaching or exceeding the bonus threshold coin-in amount, the gaming system causes one or more of such events or conditions to occur. In different embodiments, the threshold coin-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, an offer and acceptance game triggering event occurs, based on an amount coin-out. In this embodiment, the gaming system determines if an amount of coin-out provided by one or more gaming devices in the gaming system reaches or exceeds a designated amount of coin-out (i.e., a threshold coin-out amount). Upon the amount of coin-out provided at one or more gaming devices in the gaming system reaching or exceeding the threshold coin-out amount, the gaming system causes one or more of such events or conditions to occur. In different embodiments, the threshold coin-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, an offer and acceptance game triggering event occurs, based on a predefined variable reaching a defined parameter threshold. For example, when the 500,000$^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, an offer and acceptance game triggering event occurs, based on a quantity of games played. In this embodiment, a quantity of games played is set for when one or more of such events or conditions will occur. In one embodiment, such a set quantity of games played is based on historic data.

In another alternative embodiment, an offer and acceptance game triggering event occurs, based on time. In this embodiment, a time is set for when one or more of such events or conditions will occur. In one embodiment, such a set time is based on historic data.

In another alternative embodiment, an offer and acceptance game triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, an offer and acceptance game triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, an offer and acceptance game triggering event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a progressive award contribution rate reconfiguration event to occur, and/or causing a progressive award triggering event to occur may be implemented in accordance with the gaming system and method disclosed herein.

It should be appreciated that any of the above-described offer and acceptance game triggering events may be combined in one or more different embodiments.

Alternative Embodiments

It should be appreciated that in different embodiments, one or more of:
i. when an offer and acceptance game triggering event occurs;
ii. the quantity of rounds or levels in the offer and acceptance game;
iii. the amount or value of each offer for each round or level of the offer and acceptance game;
iv. the amount or value of each selection game goal amount for each selection game played for each round or level of the offer and acceptance game;
v. the quantity of picks of the selections for each play of the selection game;
vi. the amount or value associated with each selection for each play of the selection game;
vii. the quantity of each amount or value associated with the selections for each play of the selection game;
viii. the probability of a player obtaining a quantity of picks of the selections for each play of the selection game;
ix. a quantity of maintained progressive awards;
x. a quantity of progressive award tokens associated with each progressive award;
xi. the quantity of progressive award tokens provided to a player for each successful play of a rejected offer supplemental game;
xii. the type of rejected offer supplemental game employed if a player rejects an offer;
xiii. any determination disclosed herein;
is/are predetermined, randomly determined, randomly determined based on one or more weighted percentages, determined based on a generated symbol or symbol combination, determined based on a random determination by the central controller, determined based on a random determination at the gaming system, determined based on at least one play of at least one game, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 5A:
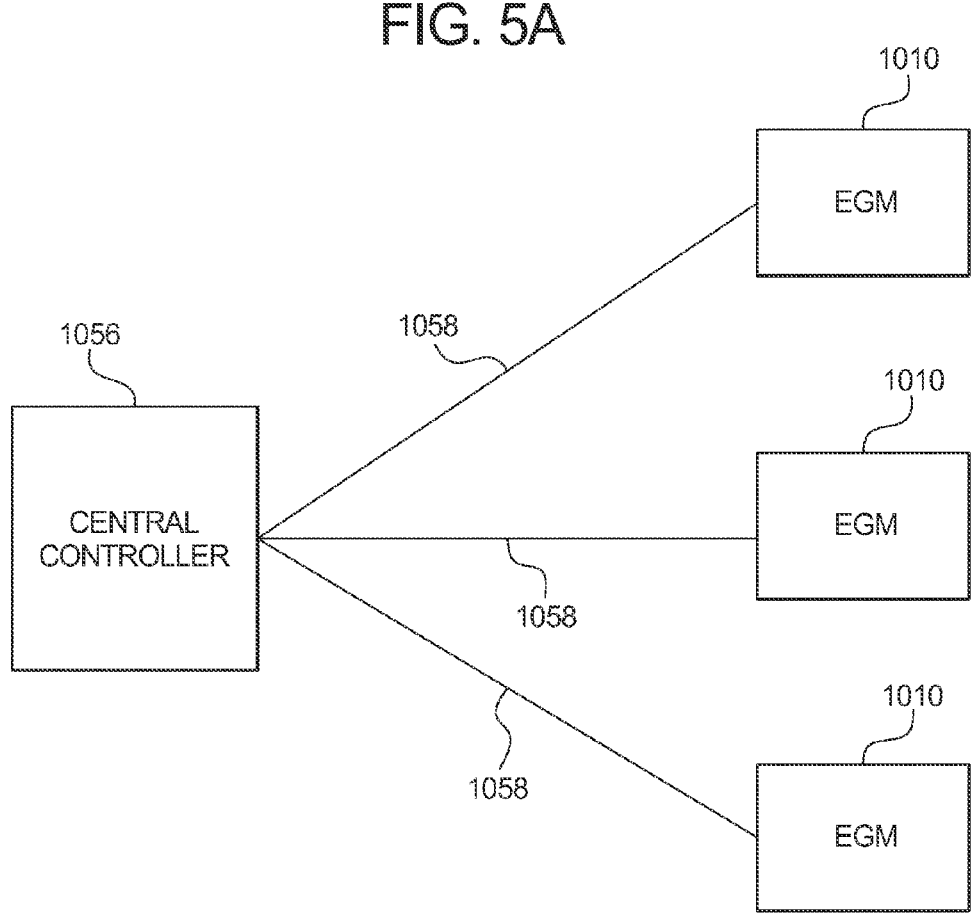
FIG. 5A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 5A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network: and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 53 illustrates an example EGM including a processor 1012.

Figure 5B:
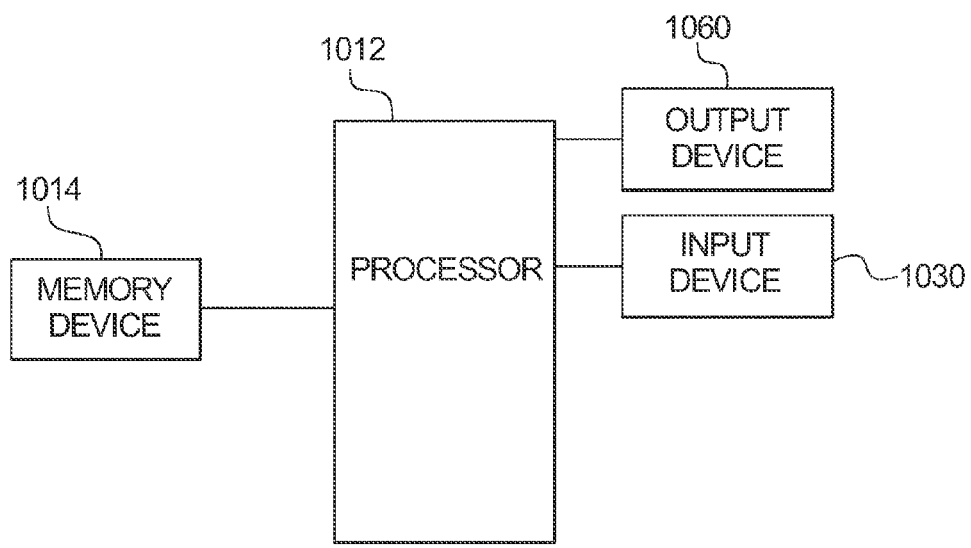
FIG. 5B is a schematic block diagram of one embodiment of an electronic configuration of the gaming system disclosed herein.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 5B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 6A:
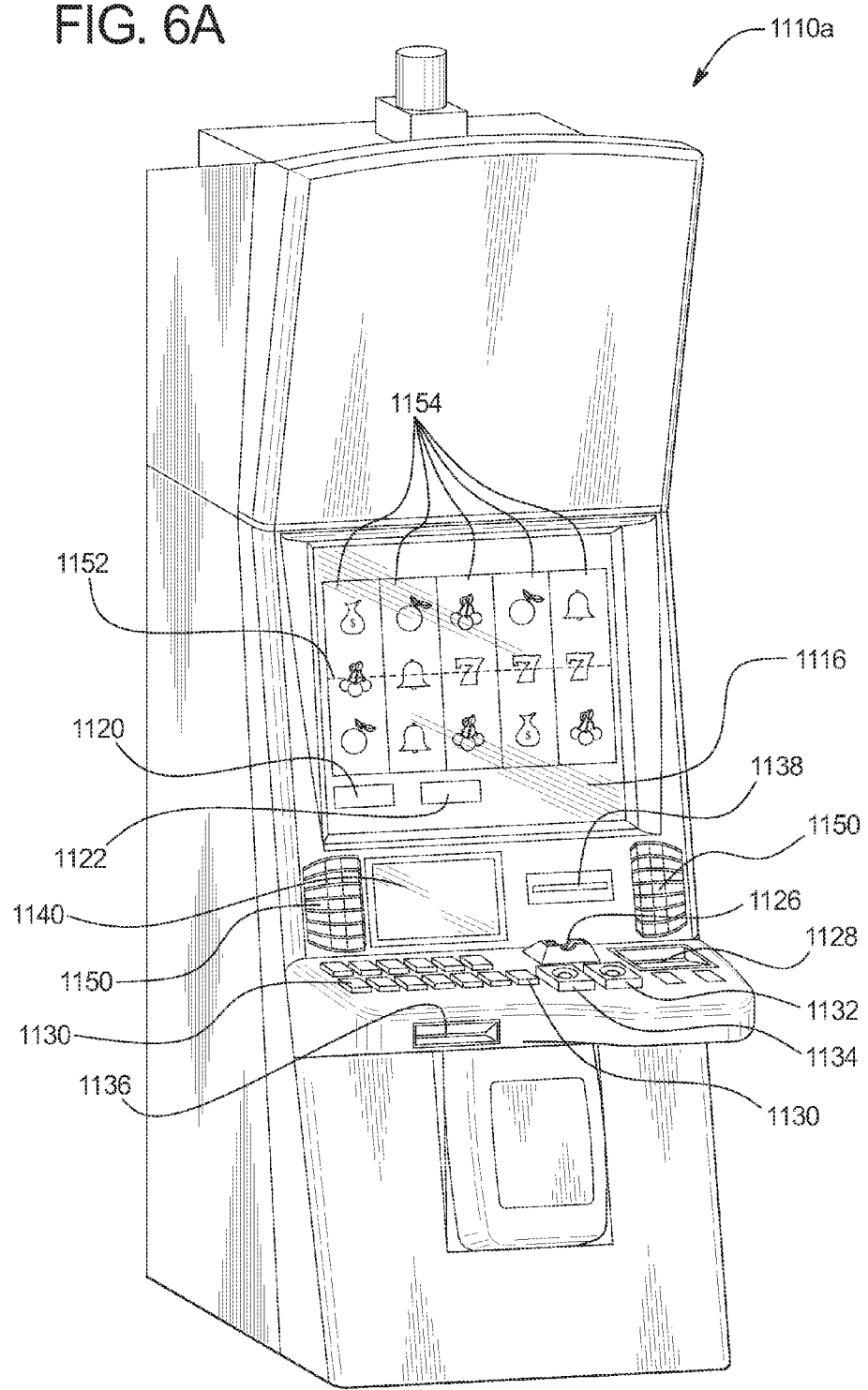
FIGS. 6A and 6B are perspective views of example alternative embodiments of the gaming system disclosed herein.
Figure 6B:
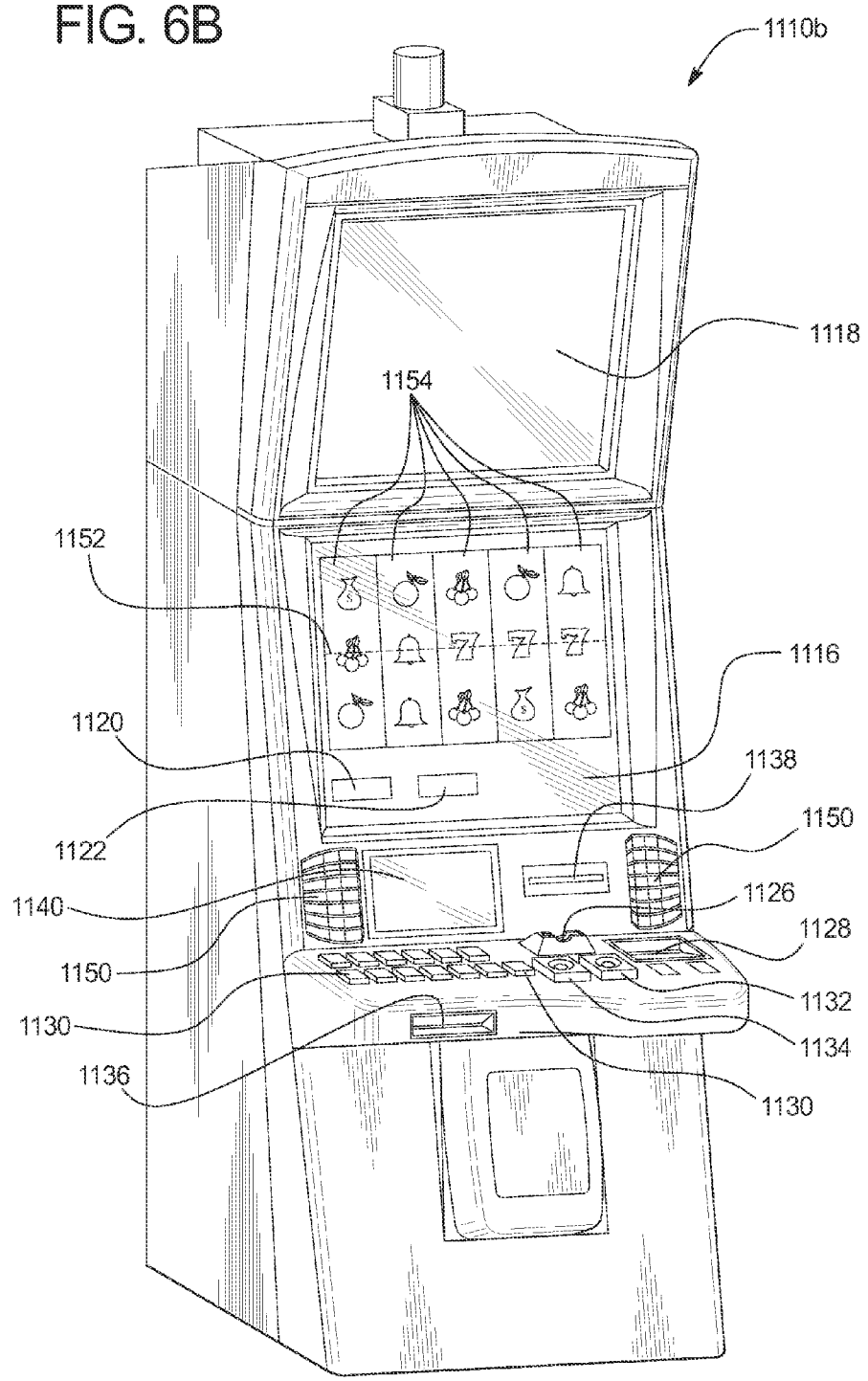

In various embodiments, the EGM includes one or more input devices. The input devices may include any suitable device that enables an input signal to be produced and received by the at least one processor of the EGM. The example EGM illustrated in FIG. 5B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 6A and 6B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 6A and 6B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 6A and 6B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 6A and 6B each include a card reader 1138. The card reader is configured to read a player identification card inserted into the card reader.

In various embodiments, the EGM includes one or more output devices. The example EGM illustrated in FIG. 5B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 6A includes a central display device 1116, a player tracking display 1140, a credit display 1120, and a bet display 1122. The example EGM illustrated in FIG. 6B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 6A and 6B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 6A and 6B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No, 2004/0254014 describes a variety of EGMs including one or more communication ports that enable the EGMs to communicate and operate with one or more external peripherals.

As generally described above, in certain embodiments, such as the example EGMs illustrated in FIGS. 6A and 63, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 6A and 6B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 200910181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller; or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 6A and 6B each include a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 201010227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments; the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified players gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions; the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card; the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
  at least one input device;
  at least one display device;
  at least one processor; and
  at least one memory device which stores a plurality of instructions, which when executed by the at least one processor, cause the at least one processor to operate with the at least one display device and the at least one input device to:
    (a) maintain a plurality of progressive awards, wherein at least two of the progressive awards are each associated with a different quantity of progressive award tokens,
    (b) display to a player an offer amount,
    (c) enable the player to accept or reject the displayed offer amount,
    (d) if the player accepts the displayed offer amount, provide the player the accepted offer amount without the player accumulating any progressive award tokens,
    (e) if the player rejects the displayed offer amount:
      (i) display to the player a plurality of selections, wherein each of the selections is associated with an award amount,
      (ii) enable the player to pick a quantity of the displayed selections, (iii) if a sum of the award amounts associated with the picked selections at least equals a rejected offer goal amount:
(A) provide the player the sum of the award amounts associated with the picked selections, and
(B) accumulate at least one progressive award token for the player, and
(iii) if the sum of the award amounts associated with the picked selections is less than the rejected offer goal amount:
(A) not provide the player the sum of the award amounts associated with the picked selections, and
(B) not accumulate any progressive award tokens for the player,
(f) repeat (b) to (e) at least once,
(g) after repeating (b) to (e) at least once, select one of the progressive awards, wherein said selection is based on a quantity of progressive award tokens accumulated for the player and the quantity of progressive award tokens associated with the selected progressive award, and
(h) provide the player the selected progressive award.

2. The gaming system of claim 1, wherein each of the progressive awards is associated with a different quantity of progressive award tokens.

3. The gaming system of claim 1, wherein when (b) to (a) are repeated at least once, the rejected offer goal amount is different.

4. The gaming system of claim 1, wherein the rejected offer goal amount is based, at least in part, on the rejected offer amount.

5. The gaming system of claim 1, wherein when executed by the at least one processor, the plurality of instructions cause the at least one processor to sequentially increase the offer amount for each repeat of (b) to (a).

6. The gaming system of claim 5, wherein when executed by the at least one processor, the plurality of instructions cause the at least one processor to sequentially increase the rejected offer goal amount for each repeat of (b) to (e).

7. The gaming system of claim 1, wherein when executed by the at least one processor, the plurality of instructions cause the at least one processor to repeat (b) to (e) for at least two of a plurality of rounds.

8. The gaming system of claim 1, wherein when executed by the at least one processor, the plurality of instructions cause the at least one processor to repeat (b) to (e) for each of a plurality of rounds.

9. The gaming system of claim 1, wherein at least one of the progressive awards is associated with an award value of zero.

10. A gaming system comprising:
at least one input device;
at least one display device;
at least one processor; and
at least one memory device which stores a plurality of instructions, which when executed by the at least one processor, cause the at least one processor to operate with the at least one display device and the at least one input device to:
(a) maintain a plurality of progressive awards, wherein at least two of the progressive awards are each associated with a different quantity of progressive award tokens,
(b) display to a player an offer amount,
(c) enable the player to accept or reject the displayed offer amount,
(d) if the player accepts the displayed offer amount, provide the player the accepted offer amount without the player accumulating any progressive award tokens,
(e) if the player rejects the displayed offer amount:
(i) enable the player to participate in a rejected offer supplemental game,
(ii) if the player obtains a winning outcome in the rejected offer supplemental game:
(A) provide the player an award associated with the winning outcome, and
(B) accumulate at least one progressive award token in association with the rejected offer for the player, and
(iii) if the player obtains a losing outcome in the rejected offer supplemental game:
(A) not provide the player any award, and
(B) not accumulate any progressive award tokens for the player,
(f) repeat (b) to (e) at least once,
(g) after repeating (b) to (e) at least once, select one of the progressive awards, wherein said selection is based on a quantity of progressive award tokens accumulated for the player and the quantity of progressive award tokens associated with the selected progressive award, and
(h) provide the player the selected progressive award.

11. The gaming system of claim 10, wherein each of the progressive awards is associated with a different quantity of progressive award tokens.

12. The gaming system of claim 10, wherein the rejected offer supplemental game includes a selection game.

13. The gaming system of claim 10, wherein when executed by the at least one processor, the plurality of instructions cause the at least one processor to sequentially increase the offer amount for each repeat of (b) to (e).

14. The gaming system of claim 13, wherein when executed by the at least one processor, the plurality of instructions cause the at least one processor to sequentially increase the probability of obtaining the losing outcome for each rejected offer supplemental game played in association with each rejected offer amount of each repeat of (b) to (e).

15. The gaming system of claim 10, wherein when executed by the at least one processor, the plurality of instructions cause the at least one processor to repeat (b) to (e) for at least two of a plurality of rounds.

16. The gaming system of claim 10, wherein when executed by the at least one processor, the plurality of instructions cause the at least one processor to repeat (b) to (e) for each of a plurality of rounds.

17. The gaming system of claim 10, wherein at least one of the progressive awards is associated with an award value of zero.

18. A gaming system comprising:
at least one input device;
at least one display device;
at least one processor; and
at least one memory device which stores a plurality of instructions, which when executed by the at least one processor, cause the at least one processor to operate with the at least one display device and the at least one input device to:
(a) maintain a plurality of progressive awards, wherein at least two of the progressive awards are each associated with a different quantity of progressive award tokens, (b) enable a player to accept or reject an offer amount in association with a play of an offer and acceptance game, (c) if the player accepts the displayed offer amount, provide the player the accepted offer amount without the player accumulating any progressive award tokens, (d) if the player rejects the displayed offer amount, enable the player to play a rejected offer supplemental game associated with an opportunity to: (i) earn at least one rejected offer supplemental game award, and (ii) accumulate at least one progressive award token, and (e) select one of the progressive awards, wherein said selection is based on a quantity of accumulated progressive award tokens and the quantity of progressive award tokens associated with the selected progressive award, and (f) provide the player the selected progressive award.

19. The gaming system of claim 18, wherein each of the progressive awards is associated with a different quantity of progressive award tokens.

20. The gaming system of claim 19, wherein at least one of the progressive awards is associated with an award value of zero.

21. A method of operating a gaming system, said method comprising:

(a) causing at least one processor to execute a plurality of instructions stored on at least one memory device to maintain a plurality of progressive awards, wherein at least two of the progressive awards are each associated with a different quantity of progressive award tokens;

(b) causing at least one display device to display to a player an offer amount;

(c) enabling the player to accept or reject the displayed offer amount;

(d) if the player accepts the displayed offer amount, providing the player the accepted offer amount without the player accumulating any progressive award tokens;

(e) if the player rejects the displayed offer amount:
(i) causing the at least one display device to display to the player a plurality of selections, wherein each of the selections is associated with an award amount,
(ii) enabling the player to pick a quantity of the displayed selections,
(iii) if a sum of the award amounts associated with the picked selections at least equals a rejected offer goal amount:
(A) providing the player the sum of the award amounts associated with the picked selections, and
(B) accumulating at least one progressive award token for the player, and
(iii) if the sum of the award amounts associated with the picked selections is less than the rejected offer goal amount:
(A) not providing the player the sum of the award amounts associated with the picked selections, and
(B) not accumulating any progressive award tokens for the player;

(f) repeating (b) to (e) at least once;

(g) after repeating (b) to (e) at least once, causing the at least one processor to execute the plurality of instructions to select one of the progressive awards, wherein said selection is based on a quantity of progressive award tokens accumulated for the player and the quantity of progressive award tokens associated with the selected progressive award; and (h) providing the player the selected progressive award.

22. The method of claim 21, wherein each of the progressive awards is associated with a different quantity of progressive award tokens.

23. The method of claim 21, wherein when (b) to (e) are repeated at least once, the rejected offer goal amount is different.

24. The method of claim 21, wherein the rejected offer goal amount is based, at least in part, on the rejected offer amount.

25. The method of claim 21, which includes causing the at least one processor to execute the plurality of instructions to sequentially increase the offer amount for each repeat of (b) to (e).

26. The method of claim 25, which includes causing the at least one processor to execute the plurality of instructions to sequentially increase the rejected offer goal amount for each repeat of (b) to (e).

27. The method of claim 21, which includes repeating (b) to (e) for at least two of a plurality of rounds.

28. The method of claim 21, which includes repeating (b) to (e) for each of a plurality of rounds.

29. The method of claim 21, wherein at least one of the progressive awards is associated with an award value of zero.

30. The method of claim 21, which is provided through a data network.

31. The method of claim 30, wherein the data network is the internet.

32. A method of operating a gaming system, said method comprising:

(a) causing at least one processor to execute a plurality of instructions stored on at least one memory device to maintain a plurality of progressive awards, wherein at least two of the progressive awards are each associated with a different quantity of progressive award tokens;

(b) causing at least one display device to display to a player an offer amount;

(c) enabling the player to accept or reject the displayed offer amount;

(d) if the player accepts the displayed offer amount, providing the player the accepted offer amount without the player accumulating any progressive award tokens;

(e) if the player rejects the displayed offer amount:
(i) enabling the player to participate in a rejected offer supplemental game,
(ii) if the player obtains a winning outcome in the rejected offer supplemental game:
(A) providing the player an award associated with the winning outcome, and
(B) accumulating at least one progressive award token in association with the rejected offer for the player, and
(iii) if the player obtains a losing outcome in the rejected offer supplemental game:
(A) not providing the player any award, and
(B) not accumulating any progressive award tokens for the player;

(f) repeating (b) to (e) at least once;

(g) after repeating (b) to (e) at least once, causing the at least one processor to execute the plurality of instructions to select one of the progressive awards, wherein said selection is based on a quantity of progressive award tokens accumulated for the player and the quantity of progressive award tokens associated with the selected progressive award; and (h) providing the player the selected progressive award.

33. The method of claim 32, wherein each of the progressive awards is associated with a different quantity of progressive award tokens.

34. The method of claim 32, wherein the rejected offer supplemental game includes a selection game.

35. The method of claim 32, which includes causing the at least one processor to execute the plurality of instructions to sequentially increase the offer amount for each repeat of (b) to (e).

36. The method of claim 35, which includes causing the at least one processor to execute the plurality of instructions to sequentially increase the probability of obtaining the losing outcome for each rejected offer supplemental game played in association with each rejected offer amount of each repeat of (b) to (e).

37. The method of claim 32, which includes repeating (b) to (e) for at least two of a plurality of rounds.

38. The method of claim 32, which includes repeating (b) to (e) for each of a plurality of rounds.

39. The method of claim 32, wherein at least one of the progressive awards is associated with an award value of zero.

40. The method of claim 32, which is provided through a data network.

41. The method of claim 40, wherein the data network is the internet.

42. A method of operating a gaming system, said method comprising:
 (a) causing at least one processor to execute a plurality of instructions stored on at least one memory device to maintain a plurality of progressive awards, wherein at least two of the progressive awards are each associated with a different quantity of progressive award tokens;
 (b) enabling a player to accept or reject an offer amount in association with a play of an offer and acceptance game;
 (c) if the player accepts the displayed offer amount, providing the player the accepted offer amount without the player accumulating any progressive award tokens;
 (d) if the player rejects the displayed offer amount, enabling the player to play a rejected offer supplemental game associated with an opportunity to: (i) earn at least one rejected offer supplemental game award, and (ii) accumulate at least one progressive award token;
 (e) causing the at least one processor to execute the plurality of instructions to select one of the progressive awards, wherein said selection is based on a quantity of accumulated progressive award tokens and the quantity of progressive award tokens associated with the selected progressive award; and
 (f) providing the player the selected progressive award.

43. The method of claim 42, wherein each of the progressive awards is associated with a different quantity of progressive award tokens.

44. The method of claim 42, wherein at least one of the progressive awards is associated with an award value of zero.

45. The method of claim 42, which is provided through a data network.

46. The method of claim 45, wherein the data network is the internet.

* * * * *

UNITED STATES PATENT AND TRADEMARK OFFICE
CERTIFICATE OF CORRECTION

PATENT NO. : 8,454,434 B1  
APPLICATION NO. : 13/524987  
DATED : June 4, 2013  
INVENTOR(S) : Craig M. Schaefer et al.

Page 1 of 1

It is certified that error appears in the above-identified patent and that said Letters Patent is hereby corrected as shown below:

IN THE CLAIMS

In Claim 3, Column 29, Line 28, replace "(a)" with --(e)--.
In Claim 5, Column 29, Line 37, replace "(a)" with --(e)--.
In Claim 14, Column 30, Line 41, replace the first instance of "the" with --a--.
In Claim 31, Column 32, Line 29, replace "the" with --an--.
In Claim 36, Column 33, Line 12, replace the first instance of "the" with --a--.
In Claim 41, Column 33, Line 25, replace "the" with --an--.
In Claim 46, Column 34, Line 28, replace "the" with --an--.

Signed and Sealed this  
Eighteenth Day of February, 2014

Michelle K. Lee  
*Deputy Director of the United States Patent and Trademark Office*